Feb. 8, 1927. 1,616,691
S. B. HASELTINE
FRICTION SHOCK ABSORBING MECHANISM
Filed Feb. 20, 1925 2 Sheets-Sheet 2
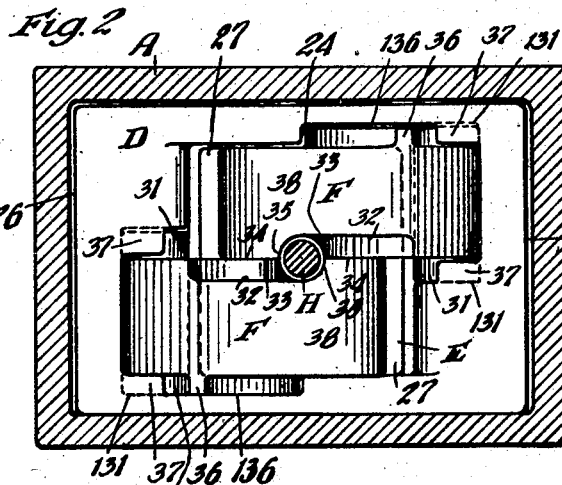
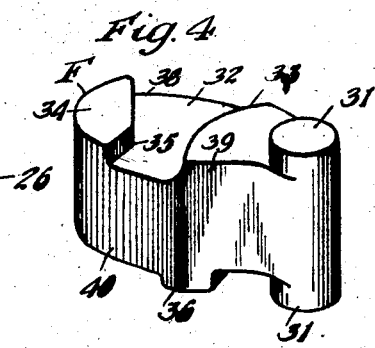
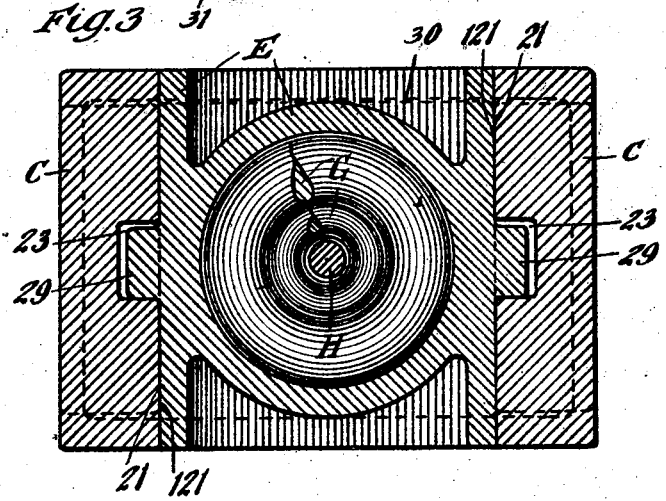
Witnesses
Wm. Geiger
Inventor
Stacy B. Haseltine
By George I. Haight
His Atty.

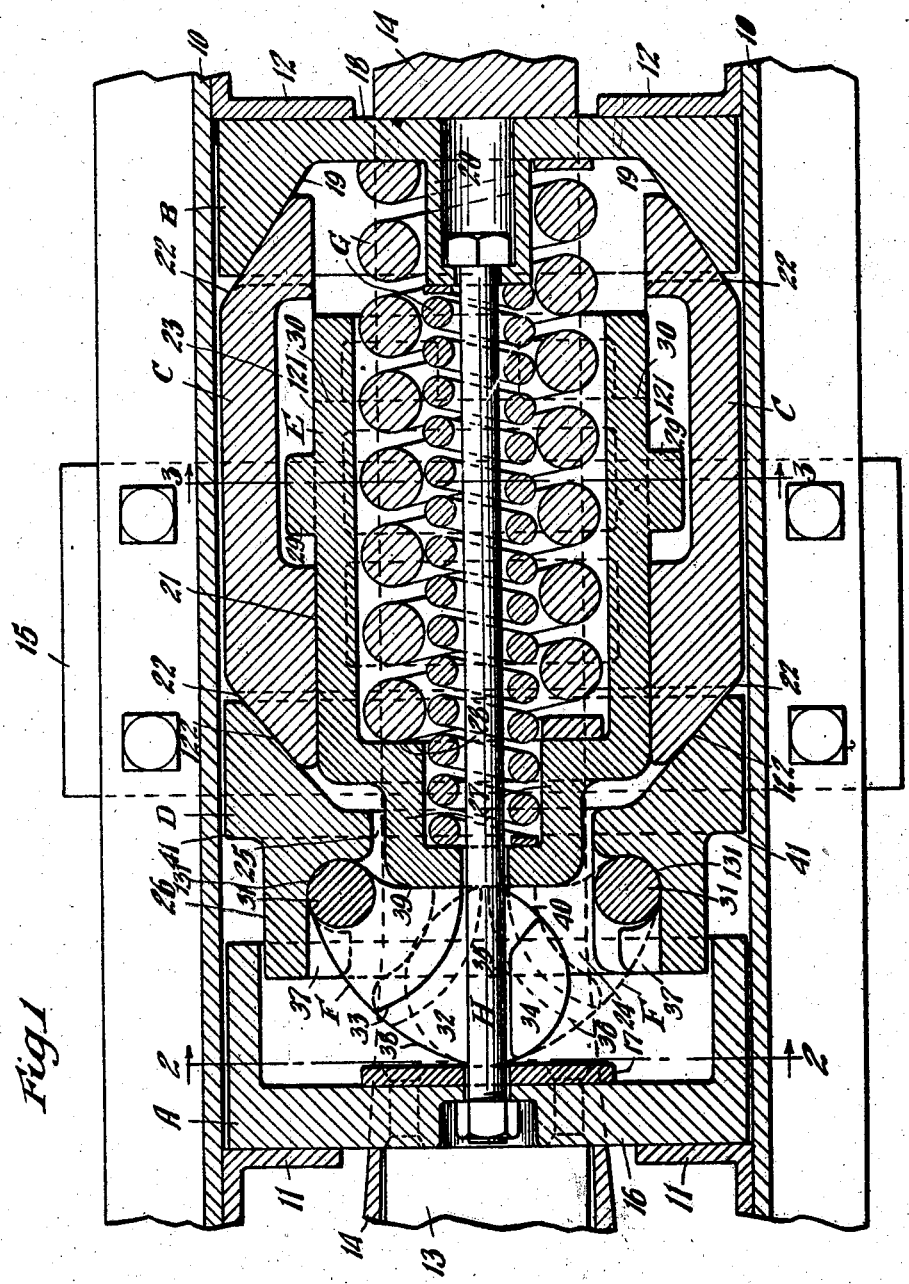

Patented Feb. 8, 1927.

1,616,691

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed February 20, 1925. Serial No. 10,450.

This invention relates to friction shock absorbing mechanisms.

One object of the invention is to provide a friction shock absorbing mechanism, especially adapted for railway draft riggings, wherein is provided exceptionally high capacity and certain release.

Another object of the invention is to provide a friction shock absorbing mechanism, of the character indicated, of simple construction, wherein a toggle action of certain of the pressure transmitting elements is had, so as to effect an augmented frictional resistance and a spring compression greater than the actual travel of the actuating element.

A further object of the invention is to provide a shock absorbing mechanism including follower acting members, side members and a central friction element having frictional engagement with the side members, wherein the main followers, the side members and central element are provided with coacting means adapted upon approach of the followers to simultaneously effect longitudinal movement of the central friction element on the side members and force the side members into engagement with the central element.

Still another and more specific object of the invention is to provide a mechanism of the character indicated, including main follower acting members, and a plurality of friction elements which are relatively movable, together with coacting rockers for forcing the friction elements into intimate contact and effecting relative movement of said elements longitudinally of the mechanism during the compression stroke.

Other objects and advantages of the invention will more clearly and fully appear from the description and claims hereinafter following.

In the drawings, forming a part of this specification, Figure 1 is a horizontal, longitudinal, sectional view of a portion of a railway draft rigging, showing my improvements in connection therewith. Figures 2 and 3 are vertical, transverse, sectional views corresponding respectively to the lines 2—2 and 3—3 of Figure 1. And Figure 4 is a detailed, perspective view of one of the rocker elements.

In said drawings, 10—10 denote channel-shaped center or draft sills of a railway car underframe, to the inner faces of which are secured front stop lugs 11—11 and rear stop lugs 12—12. The inner end portion of the drawbar is indicated at 13, the same having operatively associated therewith a hooded yoke 14 within which is disposed the shock absorbing mechanism proper. The yoke and the shock absorbing mechanism therewithin are supported in operative position by a detachable saddle plate 15.

The improved shock absorbing mechanism proper includes broadly front and rear follower acting members A and B; a pair of side members C—C; a wedge D; a central friction shell E; a pair of rockers F—F; a main spring resistance G; and a retainer bolt H.

The front and rear followers A and B are adapted to coact with the front and rear stop lugs respectively, each follower being in the form of a hollow rectangular member open at the inner end. The front follower A has a transverse outer end wall 16 which directly engages the front stop lugs, said wall being provided on the inner side thereof with a centrally disposed wear plate 17 secured by rivets or any other suitable fastening devices. The rear follower B is provided with a transverse end wall 18 which cooperates with the rear stop lugs 12. The side walls of the rear follower member are provided with opposed, interior, forwardly diverging faces 19—19 adapted to cooperate with the corresponding ends of the side members C. Between the side walls, the rear follower B is provided with an interior, centrally disposed, inwardly extending hollow boss 20 for a purpose hereinafter described.

The side members C are of like construction, each being in the form of an elongated heavy plate having a flat longitudinally disposed friction surface 21 on the inner side thereof, and inclined outer wedge surfaces 22—22 at the opposite ends thereof. The wedge faces 22 at the rear ends of the side members are adapted to cooperate with the inner wedge faces 19 of the rear follower B. On the inner side, each member C is provided with a horizontally disposed, longitudinally extending guide slot 23 for a purpose hereinafter described.

The wedge D is in the form of a relatively heavy block, of substantially rectangular outline, recessed at the front side as indicated at 24, to accommodate the pair of rockers F. At the rear end, the block D is provided with a pair of opposed, interior wedge faces 122—122, correspondingly inclined to the faces 22 at the forward end of the two side members and adapted to cooperate therewith. The block D is also provided with a central opening 25, adapted to freely accommodate the outer end of the central friction shell E, as clearly shown in Figure 1. The forward end of the block D is reduced in size as indicated at 26, to telescope within the hollow front follower A, transverse abutment shoulders 41 being thus provided to cooperate with the inner end of the main follower to limit the movement of the same when the mechanism is fully compressed, the actuating force being then transmitted directly through the wedge D, side members C, to the rear follower B.

The friction shell E is provided with a constricted front end portion 27 adapted to work within the opening 25 of the wedge block D as clearly shown in Figure 1. The interior of the main body portion of the friction shell is of substantially cylindrical form in cross-section, and of such a size as to accommodate the outer relatively larger coil of the main spring resistance D. The constricted portion of the shell provides a cylindrical bore of reduced cross-section, and is adapted to accommodate the front end of the inner, smaller coil of the main spring resistance. The constricted portion of the shell also provides a transversely disposed annular shoulder 28 at the forward end of the shell, adapted to form an abutment for the front end of the outer coil of the spring resistance G. On the opposite sides, the friction shell is provided with a pair of exterior, vertically disposed, longitudinally extending friction surfaces 121—121, adapted to cooperate with the friction surfaces 21 of the corresponding side members C. The shell is also provided with a pair of exterior lugs 29 adapted to work in the guideways 23 of the side members to support and guide the shell for longitudinal movement and prevent its dropping down between the side members C. At the rear end, the top and bottom of the shell is cut away as indicated at 30 so that the end of the shell will telescope within the hollow rear follower when the mechanism is fully compressed.

The rockers F which are two in number, are disposed between the front follower A and the wedge block D. The rockers F are of identical construction but reversely arranged. As shown in Figure 4, each of these rockers has trunnion portions 31 at one end thereof, projecting beyond the top and bottom surfaces of the rocker. In Figure 4, the top of the rocker is shown recessed, as indicated at 32, the recess 32 having a curved guide wall 33 at one side thereof and a pair of flat walls 34 and 35 angularly disposed with reference to each other at the opposite side thereof. The arrangement of the respective walls 33, 34 and 35 is such that the retainer bolt will be cleared thereby, in the various positions that the rocker may assume. At the bottom, the rocker as shown in Figure 4 is provided with a curved guide rib 36 for a purpose hereinafter described. The trunnion portions 31 of each rocker are swingingly supported in bearing seats 131—131 disposed at one side of the opening 24 of the wedge block D. As clearly shown in Figures 1 and 2, the wedge block is provided with two sets of seats 131 disposed at opposite sides of the recess 24, one set being arranged above the other. The top and bottom walls of the recess 24 adjacent the corresponding seats 131, are provided with guide-ways 136 adapted to workingly receive the corresponding guide ribs 36 of the rockers F. When the rockers are in assembled position within the wedge block D, the openings 32 are in registration and accommodate the retainer bolt as shown in Figures 1 and 2. Lugs 37 are provided adjacent each top and bottom bearing seat 131 of the wedge block D, said lugs having inner curved bearing surfaces adapted to coact with the corresponding trunnions 31 of the rockers to act as a retaining means. At the front side, each rocker is provided with a curved bearing surface 38, adapted to cooperate with and bear on the wear plate 17 of the front follower. At the rear side, each rocker has a flat bearing surface 39 and a curved bearing surface 40 adjacent thereto, the flat surface 39 abutting the outer end of the constricted portion of the friction shell when the mechanism is in the normal position as shown in Figure 1. The curved bearing surface 40 of each rocker is adapted to cooperate with the outer end of the friction shell when the rocker is swung inwardly on its trunnions.

The main spring resistance G which consists of the inner coil and outer coils hereinbefore referred to, is interposed between the friction shell and the rear follower, the rear end of the outer coil bearing directly on the transverse end wall 18 of the follower and the rear end of the inner coil bearing on the hollow boss 20.

The mechanism is held under initial compression and of uniform overall length by the retainer bolt H which has the opposite ends thereof anchored to the front and rear followers A and B, respectively, the front follower being recessed to accommodate the nut of the bolt, and the head of the bolt being accommodated within the hollow boss 20 of the rear follower.

The normal position of the parts is that shown in Figure 1, with the inner end of the front follower spaced from the abutment shoulders 41 a distance equal to the normal movement of the gear during a compression stroke. In this position of the parts, the front end of the main body portion of the friction shell is also slightly spaced from the corresponding portion of the follower block D, thereby providing for compensation for wear of the various friction and wedge surfaces.

The operation of the mechanism during a compression stroke is as follows: As the front and rear followers A and B are moved relatively toward each other, the side members C are forced inwardly against the friction shell E, due to the action of the coacting wedge faces on the side members, the wedge block D and the rear follower B, the pressure being transmitted through the medium of the rockers F from the main follower A to the wedge D. During this time, inward swinging movement of the rockers is also resisted by the main spring resistance G. As the front and rear followers A and B approach each other, the rockers will be forced to swing inwardly on their trunnions, carrying the friction shell E inwardly also, and compressing the main springs. It will be evident that during this action, the curved bearing surfaces 38 and 40 will slide on the surface of the wear plate 17 and the end face of the shell E, thereby effecting a gradually accelerated inward movement of the friction shell with reference to the main follower A. During this action of the rockers F, the effective leverage thereof will be gradually decreased, due to the gradually decreasing change in ratio of the effective lever arms of the rockers, the length of the lever arm of each rocker cooperating with the front follower gradually decreasing while the length of the lever arm of the corresponding rocker which cooperates with the friction shell increases. It will be evident that the changing action of the lever-arms gradually throws more of the applied load onto the side members through the wedge D, thus forcing the side members into tighter engagement with the shell E, the resistance of the whole device to the applied load thus considerably increased. The accelerated movement of the shell effects an additional compression of the main spring resistance. The relative approach of the front and rear followers will be limited by engagement of the inner end of the front follower with the shoulders 41 of the wedge block D, as hereinbefore pointed out, thereby preventing the main spring resistance from being driven solid, the front and rear followers, wedge and side members forming in effect a solid column for transmitting the force directly to the stop lugs of the draft sills. Upon reduction of the actuating force, the main spring resistance will return all the parts to normal position.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a plurality of relatively movable friction elements, said elements having coacting friction surfaces; of means for forcing said elements into intimate frictional contact, said means including a main follower a wedge member, said main follower having wedge means thereon; a second main follower, said main followers being relatively movable; pivoted means interposed between said second main follower and the wedge member for moving said friction elements relatively to each other and transmitting the actuating force to said wedge member; and yielding means resisting relative movement of said elements.

2. In a friction shock absorbing mechanism, the combination with front and rear follower acting elements; of a plurality of relatively movable friction members interposed between said followers, one of said followers having wedge means thereon; a wedge member associated with the other follower, said wedge member and the wedge means of said follower cooperating with the friction members for placing the latter under pressure; and lever acting means for moving said friction elements relatively to each other, said means being interposed between wedge means and the associated follower; and a main spring resistance opposing relative movement of said friction members.

3. In a friction shock absorbing mechanism, the combination with front and rear follower acting elements relatively movable toward each other; of a central friction element having longitudinally disposed friction surfaces; side friction elements cooperating with said central friction element; wedge means on one of said followers; a wedge member associated with the other follower, said wedge means and wedge member cooperating with said side friction elements; and toggle acting pressure transmitting means cooperating with the follower having the wedge member associated therewith said pressure transmitting means engaging said central friction element for moving the same with reference to said friction elements; and a main spring resistance cooperating with said central friction element.

4. In a friction shock absorbing mechanism, the combination with front and rear followers; of a friction shell interposed between said followers, said shell having longitudinally disposed friction surfaces; friction elements cooperating with the surfaces of said shell; a wedge member adjacent one of said followers, and the other follower having wedge means thereon, said wedge member and wedge means forcing said friction elements against the friction surfaces of the shell upon compression of the mechanism; means for effecting relative longitudinal movement of said friction shell and elements, rocking on the wedge member and cooperating with the adjacent follower; and a main spring resistance within the friction shell.

5. In a friction shock absorbing mechanism, the combination with front and rear followers; of a friction shell interposed between said followers, said shell having longitudinally disposed exterior friction surfaces; side friction elements cooperating with the friction surfaces of the shell, said shell and said elements being relatively movable longitudinally of the mechanism, each of said side elements having wedging engagement with one of said followers; wedge means interposed between the other follower and said side elements; toggle acting pressure transmitting means interposed between said friction shell and last named follower, said pressure transmitting means bearing on said wedge means; and a main spring resistance within said friction shell.

6. In a friction shock absorbing mechanism, the combination with front and rear followers; of a friction shell interposed between said followers, said shell having longitudinally disposed exterior friction surfaces; side friction elements cooperating with the friction surfaces of the shell, said shell and side members being relatively movable longitudinally of the mechanism; wedge means interposed between one of said followers and said side elements; toggle-acting pressure-transmitting elements interposed between said friction shell and the last named follower, said pressure transmitting elements bearing on said wedge means; and a main spring resistance within said friction shell.

7. In a friction shock absorbing mechanism, the combination with a longitudinally disposed, central friction element; side friction elements cooperating with said central element; means at the opposite ends of said side elements having wedging engagement therewith; a main follower; pressure transmitting means associated with the wedge means at one end of said elements, said pressure transmitting means bearing on said last named wedge means, the main follower and said central friction elements, the bearing contact of said pressure transmitting means on said follower and central friction element being shiftable in a direction transversely of the mechanism to accelerate the movement of said central element with reference to the main follower during compression of the mechanism; and a main spring resistance cooperating with the central friction element.

8. In a friction shock absorbing mechanism, the combination with a longitudinally disposed central friction element; of side friction elements cooperating therewith; front and rear main followers, one of said followers having wedging engagement with the corresponding ends of said elements; a wedge member interposed between the other main follower and said elements and having wedging engagement with the corresponding ends of the latter; rockers pivoted on said wedge member and having bearing on said last named follower and central element respectively; and means yieldingly resisting movement of said central element.

9. In a friction shock absorbing mechanism, the combination with side members having longitudinally disposed friction surfaces; of a longitudinally movable, central element having friction surfaces engaging the surfaces of said side elements; a main follower at one end of the mechanism having wedging engagement with the side members; a spring resistance interposed between said follower and the central friction element; a wedge element at the opposite end of the mechanism having wedging engagement with said side members; a second main follower; and rockers fulcrumed on said wedge element and bearing on said last named main follower and central element respectively.

In witness that I claim the foregoing I have hereunto subscribed my name this 14th day of February, 1925.

STACY B. HASELTINE.